United States Patent
Hofbauer et al.

(10) Patent No.: US 8,598,722 B2
(45) Date of Patent: Dec. 3, 2013

(54) ELECTRICAL GENERATOR

(75) Inventors: Peter Hofbauer, West Bloomfield, MI (US); Adrian Nicolaie Tusinean, Windsor (CA); Tyler R. Garrard, Buellton, MI (US); Patrick James McCleer, Jackson, MI (US)

(73) Assignee: EcoMotors International, Allen Park, MI (US)

( * ) Notice: Subject to any disclaimer, the term of this patent is extended or adjusted under 35 U.S.C. 154(b) by 239 days.

(21) Appl. No.: 13/043,366

(22) Filed: Mar. 8, 2011

(65) Prior Publication Data

US 2011/0215575 A1  Sep. 8, 2011

Related U.S. Application Data

(60) Provisional application No. 61/311,508, filed on Mar. 8, 2010.

(51) Int. Cl.
*H02P 9/04* (2006.01)

(52) U.S. Cl.
USPC ............. 290/4 R; 290/1 C; 290/34; 290/46

(58) Field of Classification Search
USPC ............. 290/4 R, 1 C, 34, 46; 310/114, 115
See application file for complete search history.

(56) References Cited

U.S. PATENT DOCUMENTS

| | | | |
|---|---|---|---|
| 322,310 A | 7/1885 | Ruset | |
| 4,056,746 A * | 11/1977 | Burtis | 310/115 |
| 4,562,894 A * | 1/1986 | Yang | 180/65.24 |
| 5,376,827 A | 12/1994 | Hines | |
| 5,495,907 A | 3/1996 | Data | |
| 5,844,345 A | 12/1998 | Hsu | |
| 6,051,905 A | 4/2000 | Clark | |
| 6,170,443 B1 | 1/2001 | Hofbauer | |
| 6,249,058 B1 | 6/2001 | Rea | |
| 6,278,197 B1 * | 8/2001 | Appa | 290/55 |
| 7,207,299 B2 | 4/2007 | Hofbauer | |
| 7,538,446 B2 | 5/2009 | Bonnet | |
| 7,679,249 B2 * | 3/2010 | Appa et al. | 310/114 |
| 2005/0134048 A1 * | 6/2005 | Aoyama et al. | 290/1 A |
| 2006/0163963 A1 | 7/2006 | Flores | |
| 2010/0236849 A1 * | 9/2010 | Wishart | 180/65.51 |

FOREIGN PATENT DOCUMENTS

EP  11043785  5/1993

* cited by examiner

*Primary Examiner* — Tho D Ta
(74) *Attorney, Agent, or Firm* — Diana D. Brehob

(57) ABSTRACT

An electrical generator utilizing two internal combustion engine having an expanded range of power output is disclosed. A primary internal combustion engine is coupled to the magnet rotor assembly. The primary engine is operated solely in a lower power range. A secondary engine, coupled to a coil assembly is locked in place in such lower power range to make the coil assembly stationary. In a higher power range, that overlaps the lower power range, the secondary engine is unlocked and operated to rotate in a counter-rotating direction with respect to the first engine. The secondary engine can be started by operating the generator (consisting of the magnet rotor assembly and the coil assembly) as a motor by appropriate application of current.

20 Claims, 5 Drawing Sheets

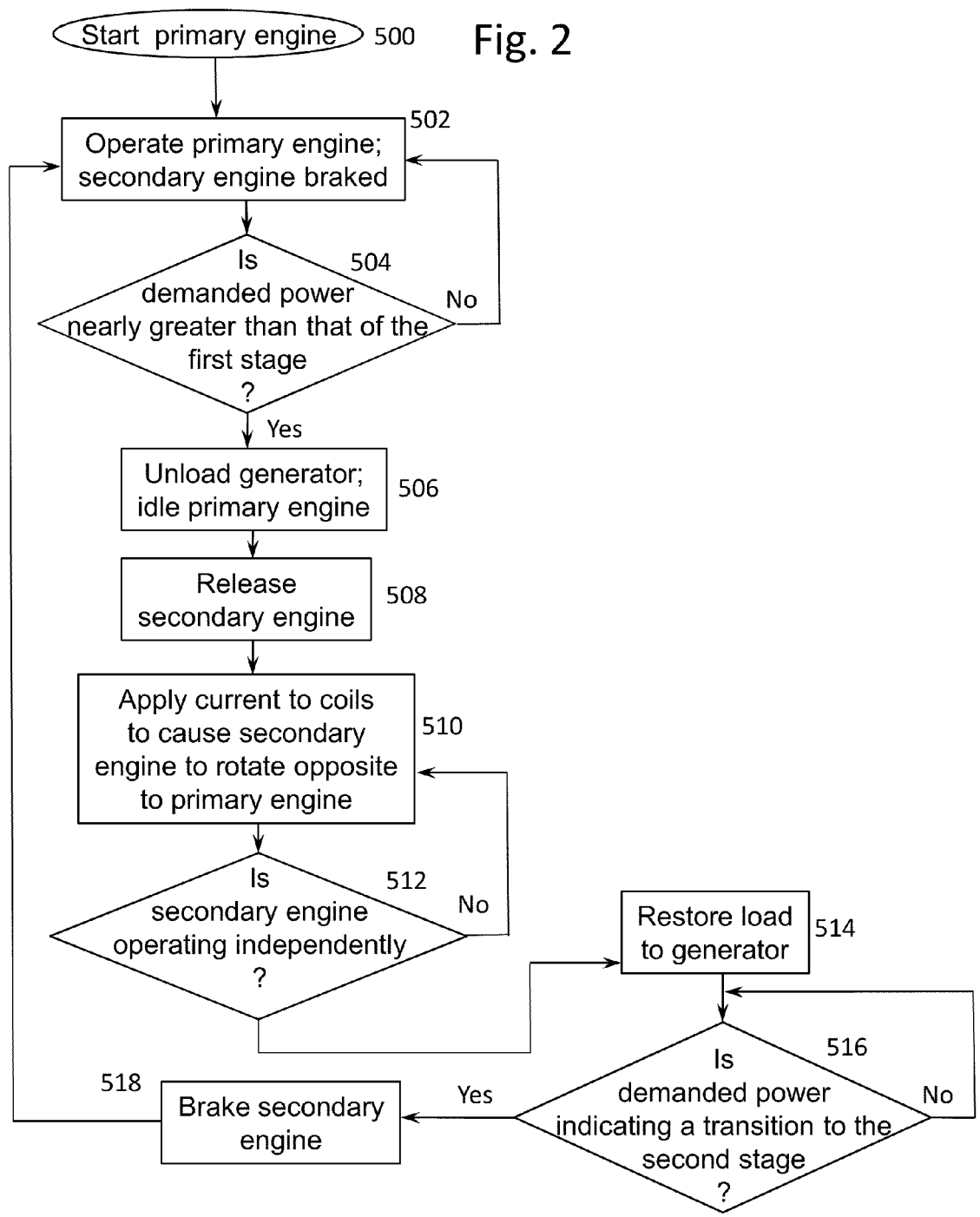

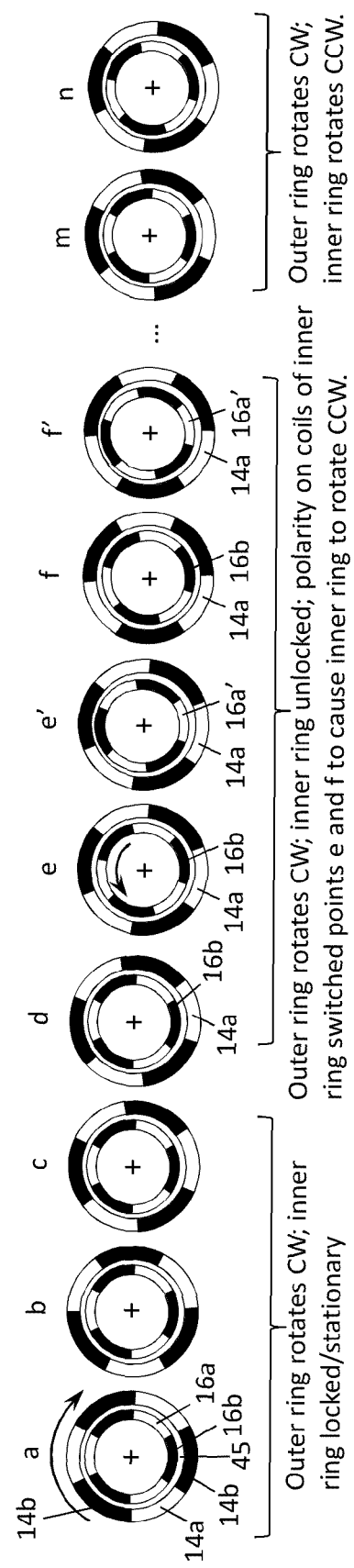

Fig. 5
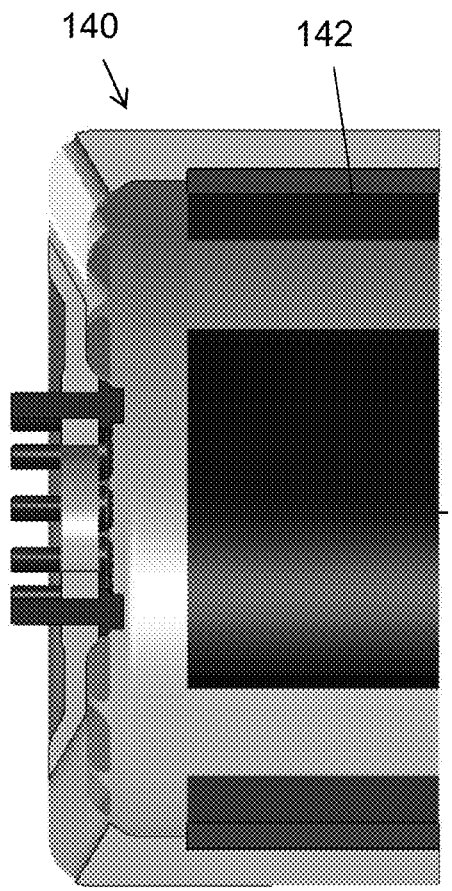
Fig. 6
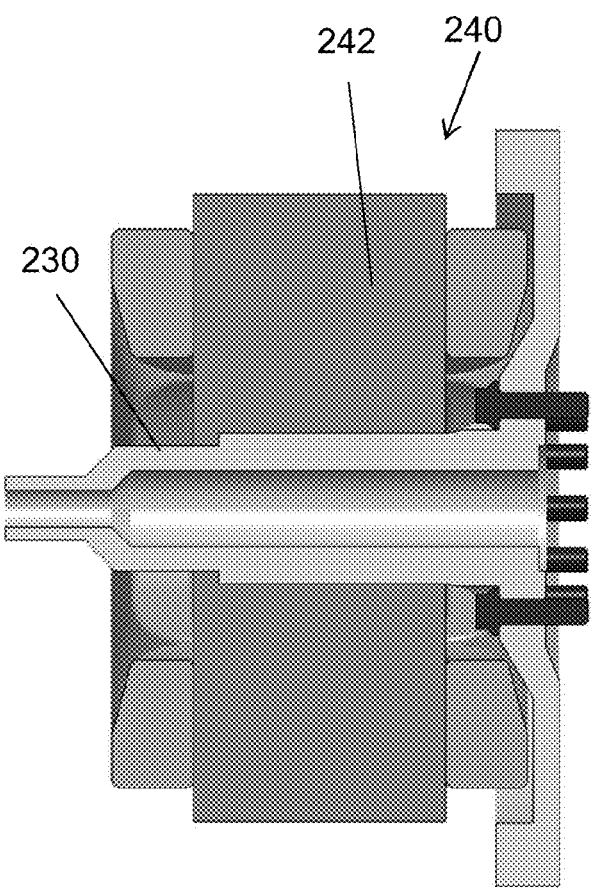
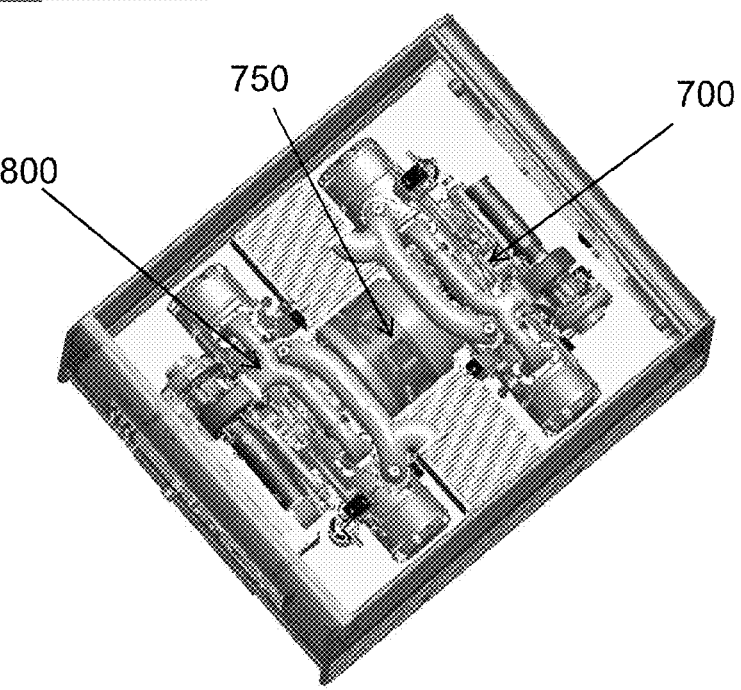
Fig. 7

320
335

328
332
330
301

ELECTRICAL GENERATOR

RELATED APPLICATIONS

This application claims priority benefit of provisional application Ser. No. 61/311,508, filed Mar. 8, 2010.

TECHNICAL FIELD

The present disclosure is related to the field of electrical generators and more specifically to the area of electrical generators that are controllable to utilize counter-rotating components for increased power output.

BACKGROUND

Conventional generators utilize a coil element and a magnet element with one element rotated with respect to the other to cause electrical current to be generated in the coil element. A continuing goal is to provide highly efficient generators that are capable of relatively high power output in a relatively small package that is low in cost and reliable to operate.

SUMMARY

The electrical generator according to an embodiment of the present disclosure may at least partially achieve the goals mentioned above by providing a pair of highly efficient and low emission internal combustion engine modules that are controlled to operate independently to rotate the respective magnet and coil elements of an electrical generator. There are at least two stages of operation achievable. In a first stage, one of the engine modules rotates one of the generator elements, while the other engine module is not operating and maintains the other generator element in a stationary position. During this first stage of operation, the generator provides electrical output power in a first range. In the second stage, both engine modules are operated and the two generator elements are rotated in counter directions with respect to one another. During this second stage of operation, the generator provides electrical output power at a second range that is generally greater than the first range.

The engine modules utilized in the embodiments shown and described herein can be related to the 2-cycle engine described in U.S. Pat. No. 6,170,443 entitled "Internal combustion engine with a single crankshaft and having opposed cylinders and opposed pistons" (referred to herein as "OPOC engine"). The details of that engine, as described and shown in the aforementioned '443 patent, are incorporated herein by reference. Although the OPOC engine provides some unique packaging and efficiency benefits and the drawings and description below are directed toward using the OPOC engine, the present disclosure is not limited to the OPOC engine. Instead, other internal combustion engines are suitable alternatives for powering the generator described herein.

The OPOC engine offers significant improvements in both fuel efficiency and emissions when employed as a prime mover in vehicles and in stationary applications. Because of its efficiency as a high density source of power and its scalability both small and large, it is highly suitable for implementation as a generator power source.

By utilizing separate engine modules the generator can operate to provide a wide range of power, as needed, while maintaining a high efficiency. When low power output is desired, the system can operate on a single engine operating at a higher efficiency than a single, larger engine would provide, operating at the same low power condition. When power output greater than what the single engine can provide is demanded, the second engine is started. There may be reasons to initiate the starting of the second engine prior to the power demand exceeding the limit of the first engine, e.g., to allow sufficient time for the second engine to start and meet the demand as required or if the power demand from the first engine is such that its efficiency is lower than desired and/or the emissions are higher than desired.

One embodiment provides for two internal combustion engine modules to have magnet and coil elements respectively connected for independent counter-rotation due to the engines being configured to rotate their drive shafts in counter-rotating directions.

Another embodiment provides for a single internal combustion engine module being configured to rotate the magnet and coil elements from a single drive shaft in counter-rotational directions by use of a gearing device connected between the drive shaft and one of the elements.

In the first embodiment, it is desirable to hold one of the generator elements stationary with respect to the rotating element when only a first engine module is in operation during relatively lower power demands. When additional power is required; the second engine module is started and the formerly stationary element is counter-rotationally driven by the second engine module. By using two smaller engines in place of one larger engine, the engine efficiency and the generator efficiency and power can be improved.

BRIEF DESCRIPTION OF THE DRAWINGS

FIG. 2 is a flow chart showing the control sequence for engaging and disengaging the secondary engine.

FIG. 3 illustrates a starting procedure for the secondary engine.

FIGS. 5 and 6 are cross sectional views of a magnet rotor assembly and a coil rotor assembly in a pulled apart view.

FIG. 7 is a generator packaged with two OPOC engines.

DETAILED DESCRIPTION

Figure 1:
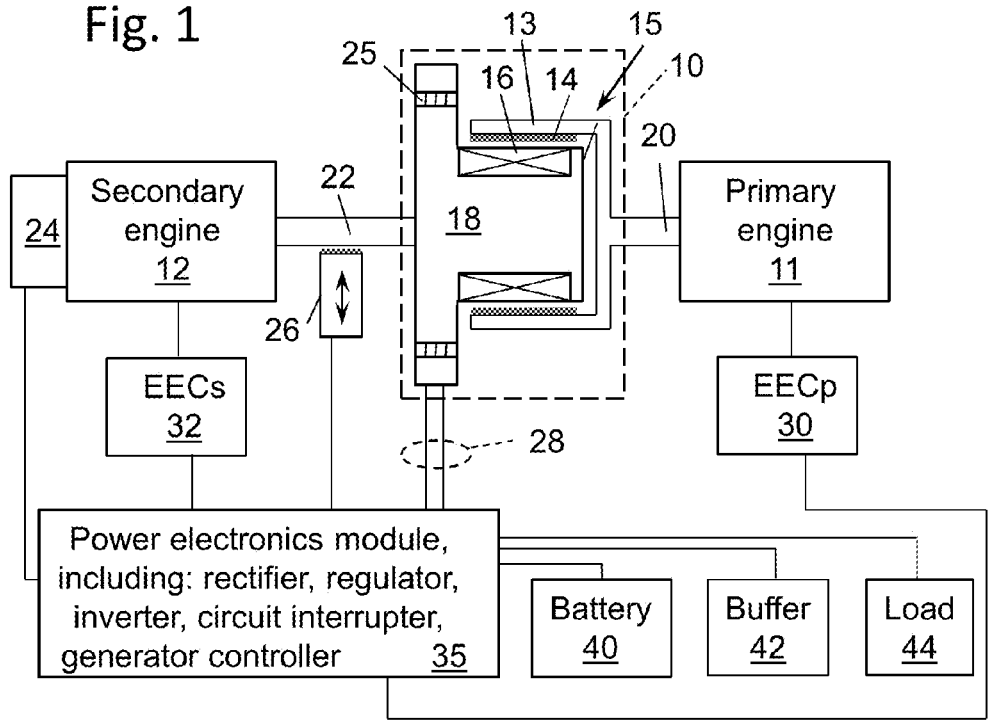
FIG. 1 is a schematic block diagram of one embodiment according to the present disclosure.

In FIG. 1, an embodiment of an electrical generator 10 is shown in a schematic/block diagram that provides for a dual power range generator that uses a single primary driving power source and, when required for an expanded power range, an additional secondary driving source to provide counter-rotating generator elements. The embodiment includes a primary engine driver 11 and secondary engine driver 12 in the form of separately controlled internal combustion engine modules. The primary engine 11 contains an output shaft 20 that is connected to the generator magnet flywheel rotor assembly 15, which includes a plurality of magnet elements 14 disposed on the inside of a magnet flywheel rotor 13. The secondary engine 12 contains an output shaft 22 that is connected to the generator coil flywheel rotor assembly 18 comprising a plurality of coils 16 disposed on the outside of a coil flywheel rotor 19. A set of slip rings 25 provides communication of current between the coils 16 and power electronic module 35 on bus 28. Two conductors are shown passing through bus 28 implying a single phase generator. However, such illustration is for clarity and not intended to be limiting. Alternatively, the generator is a three-phase generator or any suitable special-purpose type.

A locking mechanism 26 engages with shaft 22 to hold the shaft and coil assembly 18 from rotating. This is a default condition during generator startup and continuing until it is determined that the additional power of the secondary engine is required. At that time, a solenoid or other actuator is actuated and locking mechanism 26 is released to allow rotation of the shaft 22 and coil assembly 18. In the alternative, locking mechanism 26 could be actuated to prevent the shaft 22 and/or coil assembly 18 from rotating and then released when it is determined that the additional power of the secondary engine is required. A solenoid actuated locking mechanism 26 is described. In one alternative, the locking mechanism 26 is a friction brake that can be electrically or hydraulically actuated.

The output of the generator 10 is provided to the power electronics module 35 to rectify and regulate the current. Alternating current from the coil assembly 18 is converted to direct current and delivered to the battery 40, a buffer 42, and the load 44 through a power electronics module 35. While the battery 40 provides the back up and operational power to the peripheral components of the generator 10, the buffer 42 provides a higher reserve of power to support the load without interruption during periods of time when the generator 10 is in a transition phase of operation and changing from solely a primary engine driven generator with a stationary coil assembly to one that is driven by both the primary and the secondary engines with counter-rotating magnet and coil assemblies. The buffer 42 may employ a bank of capacitors or other energy storage elements that are sufficient to maintain the level of power to the load for a predetermined period of time that corresponds to the time that it takes to make the transition. Power electronics module 35, in some embodiments, includes a circuit interrupter that is activated during the transition.

The speed of primary engine 11 is controlled by a conventional electronic engine control module 30 (EECp) and the speed of secondary engine 12 is controlled by a conventional electronic engine control module 32 (EECs). Both of EECp 30 and EECs 32 communicate with power electronics control module 35 to obtain information concerning demanded power, at least.

The power electronics module 35 performs generator control sensing the power demands of the load and to provide the necessary signals to EECp and ECCs to control their operations with respect to their corresponding engines. Power electronic module 35 also controls the activation and release of the locking mechanism 26 and provides reverse phase current to the coils 16 of the coil assembly 18 during the transition phase to effect counter-rotation of the coil assembly 18 with respect to the magnet assembly 15 and starting of the secondary engine 12. Power electronics module 35 also includes an inverter to provide DC to the battery 40, buffer 42, and/or load 44.

As discussed below in relation to FIG. 3, the secondary engine 12 can be started by manipulating the current provided to the coils. Alternatively, a starter motor 24 can be provided and control by the power electronics module 35.

In the schematic in FIG. 1, the magnet assembly 15 is shown outside of coil assembly 18. Alternatively, the coil assembly is positioned outside magnet assembly 15.

FIG. 2 is a block diagram that illustrates one embodiment of a method to allow the generator to transition from a single engine drive of a first rotor element (e.g., magnets) to a dual engine drive in which the first and second rotor elements are counter-rotated with respect to each other.

The primary engine 11 is started, in 500, by employing the generator 10 as a motor to provide motive force to the engine 11 to initiate rotation. When the primary engine 11 is operating at 502, the primary engine 11 drives the connected rotor element 15 to rotate at a speed that corresponds to the speed of the primary engine 11 and the generator 10 operates as an electrical generator. At 504, a determination is made as to whether or not the power demands of the load 44 is approaching a designated upper limit of the relatively lower and first power range capability of the generator driven by the primary engine alone. If the power level is not approaching the designated upper limit, the primary engine 11 continues to operate alone, i.e., control return to 502. If it is determined that the power level is approaching the designated upper limit, the power electronics module 35 commences the transition phase that causes the secondary engine 12 to start and to come on line to provide counter-rotation drive to its associated generator element (coil assembly 18) and provide power to the load that has a greater range than the first range.

At step 506, the generator 10 and the primary engine 11 are unloaded. The primary engine is commanded to its idle speed. In one alternative, the primary engine 11 is maintained at the speed it was operating at prior to unloading or to some other higher speed than idle. At 508, locking mechanism 26 is released, to allow the coil assembly 18 to rotate with the secondary engine shaft 22. In embodiments in which the locking mechanism 26 is a friction brake, the brake is released. At 510, the power electronics module applies opposite phase current to the coils in the coil assembly 18 through bus 28 to overcome that which is induced by the rotating magnet assembly 15 to cause the coil to rotate in a counter direction with respect to the rotating magnetic assembly 15. The procedure for causing the coil assembly 18 to rotate counter to the magnet assembly 15 is discussed in regards to discussion related to FIG. 3. When such counter rotation occurs in the coil assembly 18 and fuel and spark are provided to the secondary engine 12 by EECs 32, the secondary engine 12 is started. At 512, it is determined if secondary engine 12 is operating on its own. This may be performed by monitoring information from the EECs 32 to determine if the secondary engine has reached at least its designated idle speed. If the secondary engine 12 is determined to be not operating on its own, the power electronics moduel 35 again applies opposite phase current to the coils in the coil assembly 18 through bus 28 until the determination is otherwise.

When the determination is made that the secondary engine 12 is operating on its own, the load 44 is again applied to the generator 10 by deactivating the circuit interruption (as controlled by power electronics module 35) in 514 and the generator continues to operate with both primary and secondary engines operating to supply the desired power to the load.

At 516, a determination is made regarding the power demand made to the generator. If a determination is made that the power demand has been continuously below a designated lower limit—preferably lower than the designated upper limit of the first range to provide hysteresis and avoid unnecessary switching—for a predetermined period of time, the secondary engine 12 is stopped at step 518. Following step 516, the locking mechanism is engaged at 520 to lock the coil assembly 18 in a stationary position with respect to the rotating magnet assembly 14 while the primary engine continues to solely provide drive power to the generator alone.

If the determination at 516 is that the power demand is above the designated lower limit or has not been below the lower designated limit for a sufficient continuous period of time, 516 is repeated and the secondary engine 12 continues to run along with the primary engine 11, to allow the generator to continue to provide power within the extended range.

The primary engine is started via the generator operating as a motor. In FIG. 3, a method by which the secondary engine can be started in a direction counter to the primary engine is illustrated. The primary engine is coupled to the outer ring in FIG. 3. The black sectors are north-pole magnets 14b and the unshaded sectors are south-pole magnets 14a. In the example shown in FIG. 3, there are three north-pole magnets 14b and three south-pole magnets 14a around the periphery with only a subset of them having numerals and leader lines to ensure clarity in FIG. 3. At time a the outer ring is rotating clockwise. The inner ring is separated from the outer ring by a small air gap 45. The inner ring has coils through which a current is passed. The coils also have a defined polarity with the north-pole coils 16b shown as shaded and south-pole coils shown as unshaded 16a. At time a, the inner ring is maintained stationary as the electrical energy demand is not so great requiring the secondary engine to operate. At times b and c, it can be seen that the outer ring has rotated clockwise while the inner ring remains stationary. At time d, the lock on the secondary engine has been released to allow it to rotate also. Recall that magnets are attracted to opposites. Considering the position of magnet 14a and coil 16b at time d, the now free inner ring is urged to move counterclockwise to cause the coil 16b to line up with 14a of the opposite polarity. The outer ring, as it is powered by the primary engine, continues to rotate clockwise regardless of what is occurring with regard to the inner ring. However, the secondary engine is not yet started and the relative polarities and positions of the two rings determine the rotation of the inner ring. At time e, the inner ring is moving counterclockwise, but due to the relative positions of magnet 14a and coil 16b would be urged to rotate clockwise. To avoid such a situation, the polarity in the coils is switched by reversing the current flow in the coils. Thus, at time e, such current reversal is commanded, so that at the instant afterward, time e', the former 16b, which was a north-pole coil, is now a south-pole coil 16a'. Upon switching, magnet 14a and coil 16a', which repel each other, cause the inner coil to be urged counterclockwise. At time f, the inner coil continues to move counterclockwise due to inertia. However, the position of magnet 14a with respect to coil 16a is again unfavorable. Thus, the current flowing through the coils is reversed so that the coil which is a north-pole 16b at f is switched to a south-pole 16a'. The relative positions of the magnets and coils are now positioned in f' to urge the inner ring in a counterclockwise direction. The polarity switching continues until the secondary engine is started and operates independently. Thus, at time m, the outer ring rotates clockwise under power of the primary engine and the inner ring rotates counterclockwise under power of the secondary engine and continues at time n and following. In such operation, there is no polarity switching.

While the disclosed subject matter summarized above is applicable with several types of internal combustion engines, it is exemplified herein as being embodied with 2-cycle OPOC engine modules, such as that shown in the above-incorporated U.S. Pat. No. No. 6,170,443.

Figure 4:
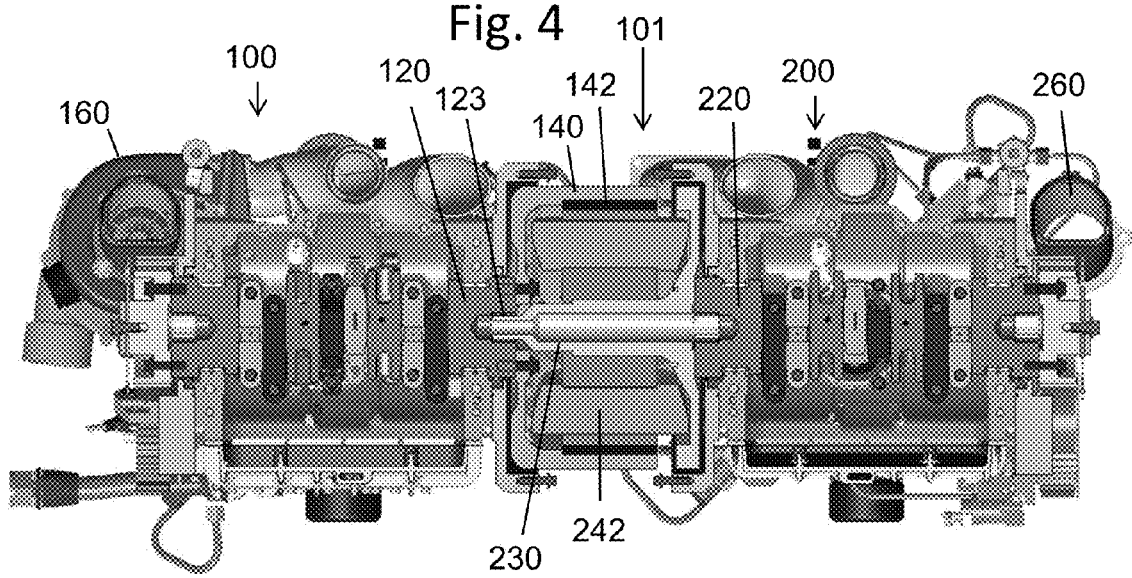
FIG. 4 is a cross-sectional view of an embodiment of an electrical generator and two OPOC engines.

An embodiment of electrical generator 101 is shown which includes a primary engine module 100 and a secondary engine module 200 is shown in cross section in FIG. 4. The two engine modules have their respective crank shafts 120 and 220 aligned along a common axis. (In this embodiment, the primary and secondary engine modules are OPOC engine modules with turbochargers 160 and 260.) A journal of crankshaft 120 serves as the take-off drive for engine module 100 and is connected to a magnet rotor assembly 140 containing a plurality of permanent magnets 142 mounted on the underside for rotation about the coils 242 in the coil rotor assembly. A journal of crankshaft journal 220 serves as the take-off drive for engine module 200 and is connected to a flywheel coil assembly (not individually shown in FIG. 4) of the electrical generator 101.

A connector shaft 230 extends from the crankshaft 220 the secondary engine 200 and has an end that is received for free rotation within a cavity 123 formed in a journal of crankshaft 120. Thus, alignment of the crankshafts is maintained for counter-rotation along a common axis, while maintaining a constant separation (air gap) between the outer and inner rotating magnet and coil assemblies.

In FIG. 5, the magnet rotor assembly 140 is shown in cross-section and separated axially with respect to coil rotor assembly 240 of FIG. 6, also shown in cross section.

A package including a primary OPOC engine 600 and a secondary OPOC engine 800 with a generator 750 coupled between is shown in FIG. 7. The envelope of the OPOC engine is conducive to efficient packaging of two engines coupled to form a generator assembly. In this package, each engine is retained in place to prevent reverse torque and the electronics control module is packaged between the engine modules. Although not shown, the package may also include a fuel source or connectors to provide such fuel, electrical connectors, power meters, sensors, exhaust muffling, exhaust aftertreatment, etc.

When power is demanded from the generator that exceeds the lower power range, and/or the speed of primary engine module is at the highest desired speed for this operation, the secondary engine module is started and causes the coil assembly to be rotated in the opposite direction to produce additional power within the second higher power range. Also, it may be more efficient to operate two engines at half power than one engine at full power. So, it might be useful to initiate operation of the secondary engine when the power demanded approaches something lower than half of the total power that the two engines can provide. Also, when operating with the secondary engine in operation, it is useful to avoid continually stopping and starting the secondary engine when the power demand increases and decreases marginally. Thus, one control decision discussed above with respect to FIG. 2 provides hysteresis in choosing when to turn the secondary engine on and off. Also, when the secondary engine module operates, the speed of the primary engine module 100 can be operated at a lower speed than when it was operating alone, until further power is demanded. Based on load demand and mapped efficiencies of the engine modules, the controller can determine the most efficient operating stage of the generator system.

Starting the second engine module so that its crankshaft rotates in the opposite direction of the primary engine module is described above with a fairly elegant solution. However, in an alternative arrangement, a separate starter motor is provided to the secondary engine module to obviate applying reverse phase current to the coils during start up.

Another solution is to engage the secondary engine with the primary engine to start the secondary engine in the same rotational direction as the primary engine and to gear the coil assembly with the secondary engine to rotate in the opposite direction as the secondary engine output shaft and the magnetic assembly. In this manner, a clutch can be provided between the crankshafts of the two engine modules so that the inertia of the operating primary engine module is used to start the secondary engine module when the clutch is engaged. After initial start of the secondary engine module, the clutch is released and the two engines operate independently.

To facilitate starting, some embodiments include a buffer system to maintain level output voltage and current during transitions from operation with the primary engine to operation with both engines. If starting the secondary engine module 200 utilizes energy from the primary engine module 100, the buffer system maintains the power output over the starting period while the electrical load applied to the primary engine module is interrupted (disconnected) and the secondary engine load is started by loading the primary engine and controlling the current in the coils. Otherwise, the primary engine would become overloaded and may stall. As soon as the secondary engine module is started, the primary engine can then be reconnected to the load. Such a buffer shown in FIG. 1 may be an electrical buffer system such as batteries, capacitors or a mechanical buffer system such as a separate flywheel generator.

Figure 8:
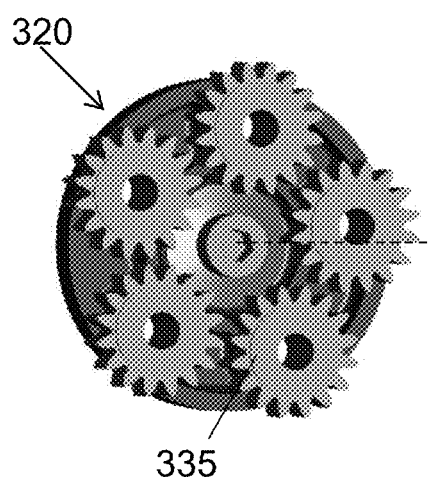
FIGS. 8 and 9 illustrate an alternative embodiment with a counter-rotating generator capable of being driven by a single engine.
Figure 9:
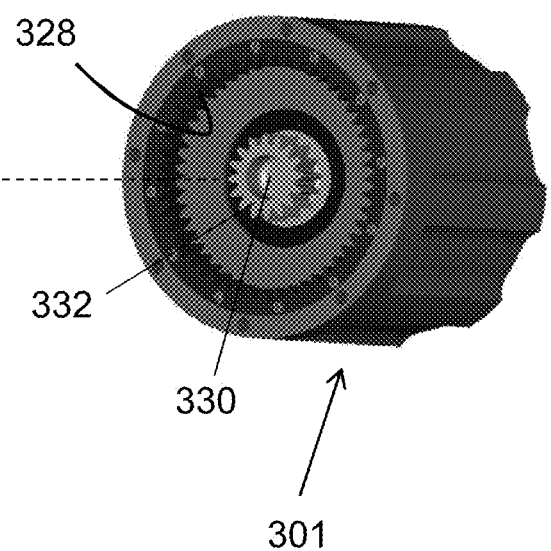

In an alternative embodiment illustrated in FIGS. 8 and 9, a reversing gear assembly 320 is shown in which a single internal combustion engine (not shown) is used to drive both portions of the generator 301. A sun gear 332 is coupled to shaft 330 onto which the coil rotor assembly (not visible) is affixed. The outer portion of generator 301 is the magnet rotor assembly, which has a ring gear 328 on an inner surface. When the reversing gear assembly 320 is coupled with the generator 301, the sun gear 332 rotating at engine speed couples with planetary gears 335 of reversing gear assembly 320. The planetary gears 335 couple with the ring gear 328 coupled to the magnet rotor assembly. In such a manner, the reversing gear assembly 320 provides for the magnet rotor assembly to rotate in an opposite direction with respect to the coil rotor assembly. In an alternative embodiment, the coil rotor assembly is coupled directly to the engine and the magnet rotor assembly is driven by a reversing gear assembly. One advantage of this embodiment is the compactness and high output from a single engine module used to drive counter-rotating elements of an electrical generator. To obtain a high relative speed between the magnet rotor assembly and the coil rotor assembly, the diameter of the two can be increased, as peak engine speed is limited. However, if only one of the elements rotates, the increase in diameter causes the peak speed of the one element to increase, possibly beyond its peak speed. By rotating each of the elements, in opposite directions, at half engine rotational speed, the relative speed of the two elements is increased without unduly increasing the speed of a single element.

As can be seen by the drawings and accompanying explanation, this disclosure provides a unique improvement over conventional electrical generator systems. And while the embodiments shown here are preferred, depending on the engineering applications and requirements, they shall not be considered to be a restriction on the scope of the claims set forth below.

We claim:

1. An electrical generator assembly, comprising:
   a magnet rotor assembly including a plurality of magnetic elements;
   a coil assembly containing a plurality of electrically conductive coils positioned coaxially with the magnet rotor assembly and adjacent thereto to receive induced flux when the magnet rotor assembly is rotated with respect to the coil assembly;
   a first internal combustion engine directly coupled to the magnet rotor assembly for rotating the magnet rotor assembly in a first direction; and
   a second internal combustion engine directly coupled to the coil assembly wherein the second internal combustion engine rotates in a direction opposite to the first direction when the second internal combustion engine is commanded to operate and operation of the second internal combustion engine during electrical energy generation in the electrical generator assembly is selectable.

2. The electrical generator assembly of claim 1, wherein the first internal combustion engine has an output shaft connected to the magnet assembly.

3. The electrical generator assembly of claim 1, wherein the second internal combustion engine has an output shaft connected to the coil assembly.

4. The electrical generator assembly of claim 1, further comprising;
   a brake located proximate a rotating component of the second engine; and
   a controller coupled to the brake to actuate the brake during a first stage of operation and to cause the brake to move away from the rotating component of the second engine during a second stage of operation.

5. The electrical generator assembly of claim 1, further comprising:
   slip rings electrically coupled to the coil assembly, the slip rings remaining stationary at all operating conditions and sliding with respect to the coil assembly when the coil assembly rotates; and
   conductors electrically coupling the coils of the coil assembly with a power electronics controller via the slip rings.

6. The electrical generator assembly of claim 1 wherein the first engine operates substantially during all operation of the electrical generator and the second engine remains stationary during a first stage of operation and operates during a second stage of operation.

7. The electrical generator assembly of claim 6 wherein the first stage comprises a power output level from the electrical generator assembly that is generally less the power output level of the electrical generator assembly associated with the second stage.

8. The electrical generator assembly of claim 6, further comprising:
   a controller to start and operate the second internal combustion engine to drive the coil assembly in the direction opposite to the first direction during the second stage of operation.

9. A method to control an electrical generator having a magnet assembly separated from a coil assembly by an air gap wherein the magnet assembly is directly coupled to a primary internal combustion engine and rotates at the same speed as the primary internal combustion engine; the coil assembly is directly coupled to a secondary internal combustion engine and rotates at the same speed as the secondary internal combustion engine; and the secondary engine has a selectable locking mechanism, the method comprising:
   starting the primary engine via the electrical generator acting as a motor;
   generating electricity by operating the primary engine while the secondary engine remains stationary;
   unloading the generator when a transition from a first stage of operation to a second stage of operation is indicated;
   releasing the locking mechanism;
   rotating the secondary engine in a direction opposite to the rotational direction of the primary engine; and
   restoring load on the generator in response a determination that the secondary engine is operating independently.

10. The method of claim 9 wherein the locking mechanism is a friction brake.

11. The method of claim 9, further comprising:
switching direction of current provided to the coils of the coil assembly in such a manner to cause the secondary engine to rotate in an opposite direction with respect a direction of rotation of the primary engine.

12. The method of claim 9, further comprising: stopping the secondary engine based at least on demanded power being below a threshold level.

13. The method of claim 9 wherein a starter motor is coupled to the secondary engine and rotation of the secondary engine in the opposite direction with respect to the primary engine is provided by the starter motor.

14. The method of claim 9 wherein an electrical storage device is coupled to the generator and the electrical storage device provides electrical energy during an interval between the unloading the generator and the restoring load on the generator.

15. The method of claim 14 wherein the electrical storage device is at least one of a battery and an ultra-capacitor.

16. An electrical generator, comprising:
a primary internal combustion engine directly coupled to a magnet assembly such that the primary internal combustion engine and the magnet assembly rotate at the same rotational speed;
a secondary internal combustion engine directly coupled to a coil assembly such that the secondary internal combustion engine and the coil assembly rotate at the same rotational speed wherein magnets of the coil assembly are separated from magnets of the magnet assembly by an air gap;
a locking mechanism associated with the second internal combustion engine, the locking mechanism being actuated to prevent rotation of the secondary internal combustion engine upon startup of the primary internal combustion engine; and
a power electronics controller for controlling current through the coils.

17. The generator of claim 16, further comprising:
a primary engine controller electronically coupled to the primary engine and the power electronics controller; and
a secondary engine controller electronically coupled to the secondary engine and the power electronics controller wherein the power electronics controller provides signals to the engine controllers concerning demanded power.

18. The generator of claim 16, further comprising:
a locking mechanism provided to a rotating component of the secondary engine wherein the locking mechanism is actuated under control of the power electronics controller.

19. The generator of claim 16, further comprising:
a controller electrically coupled to the locking mechanism wherein the controller actuates the locking mechanism and the locking mechanism is a friction brake.

20. The generator of claim 16 wherein a first stage of operation is indicated when a load on the generator is in a lower range, a second stage of operation is indicated with the load on the generator is in a higher range, the primary engine rotates and the secondary engine is stationary in the first stage, the primary and secondary engines rotate in opposite direction in the second stage, and the first range in load overlaps with the second range in load.

* * * * *